Dec. 22, 1953     A. S. KINSINGER     2,663,515
EXCAVATING AND CABLE LAYING MACHINE
Filed Feb. 13, 1951     9 Sheets-Sheet 5
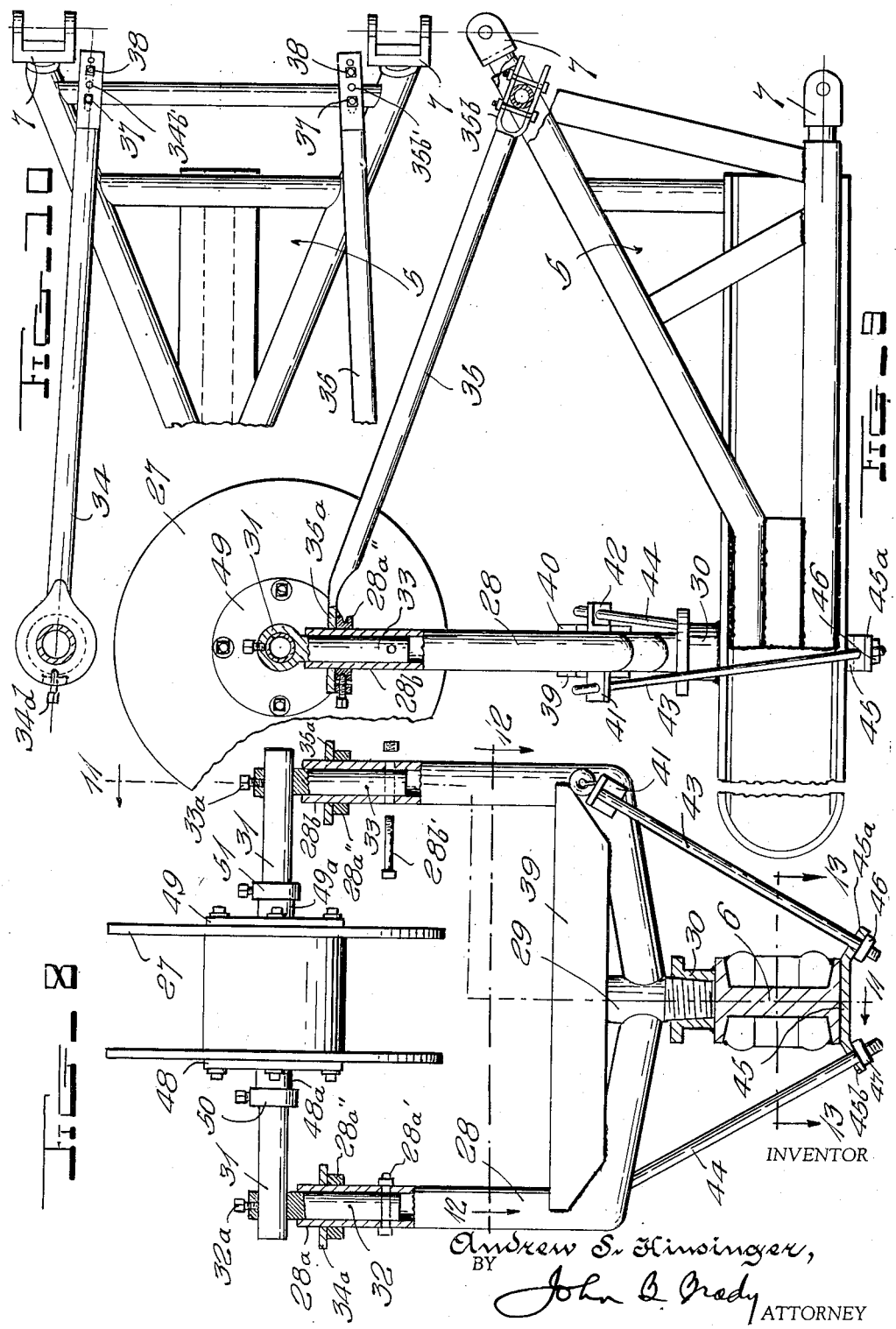
INVENTOR
Andrew S. Kinsinger,
BY John B. Grady
ATTORNEY

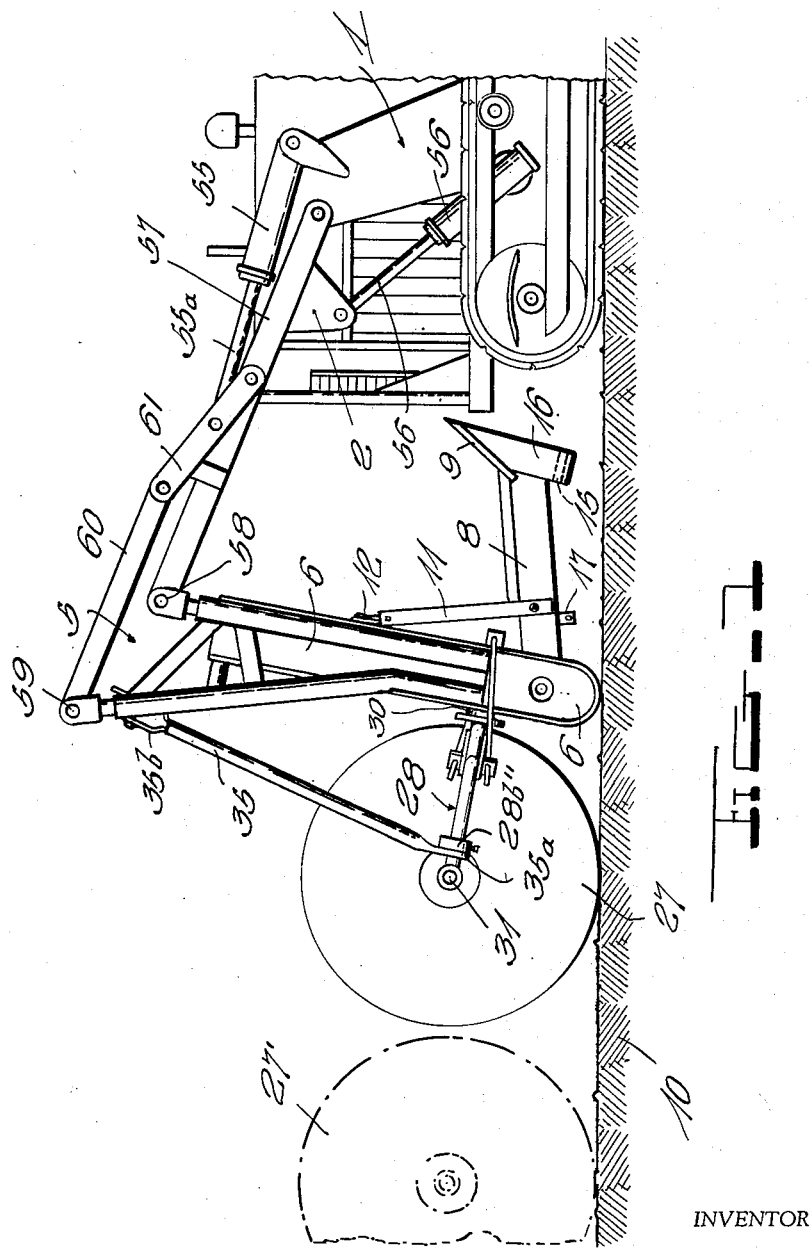

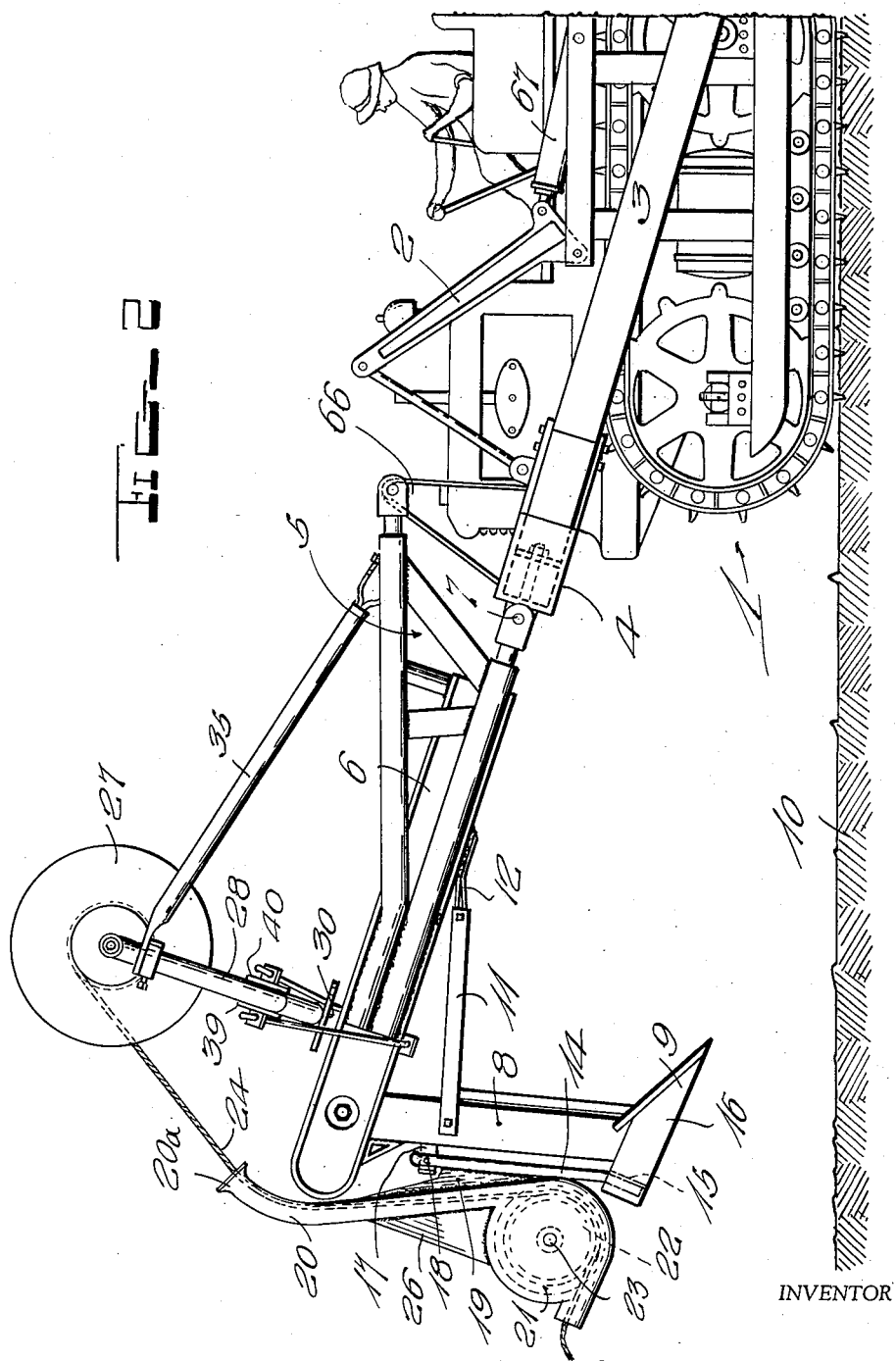

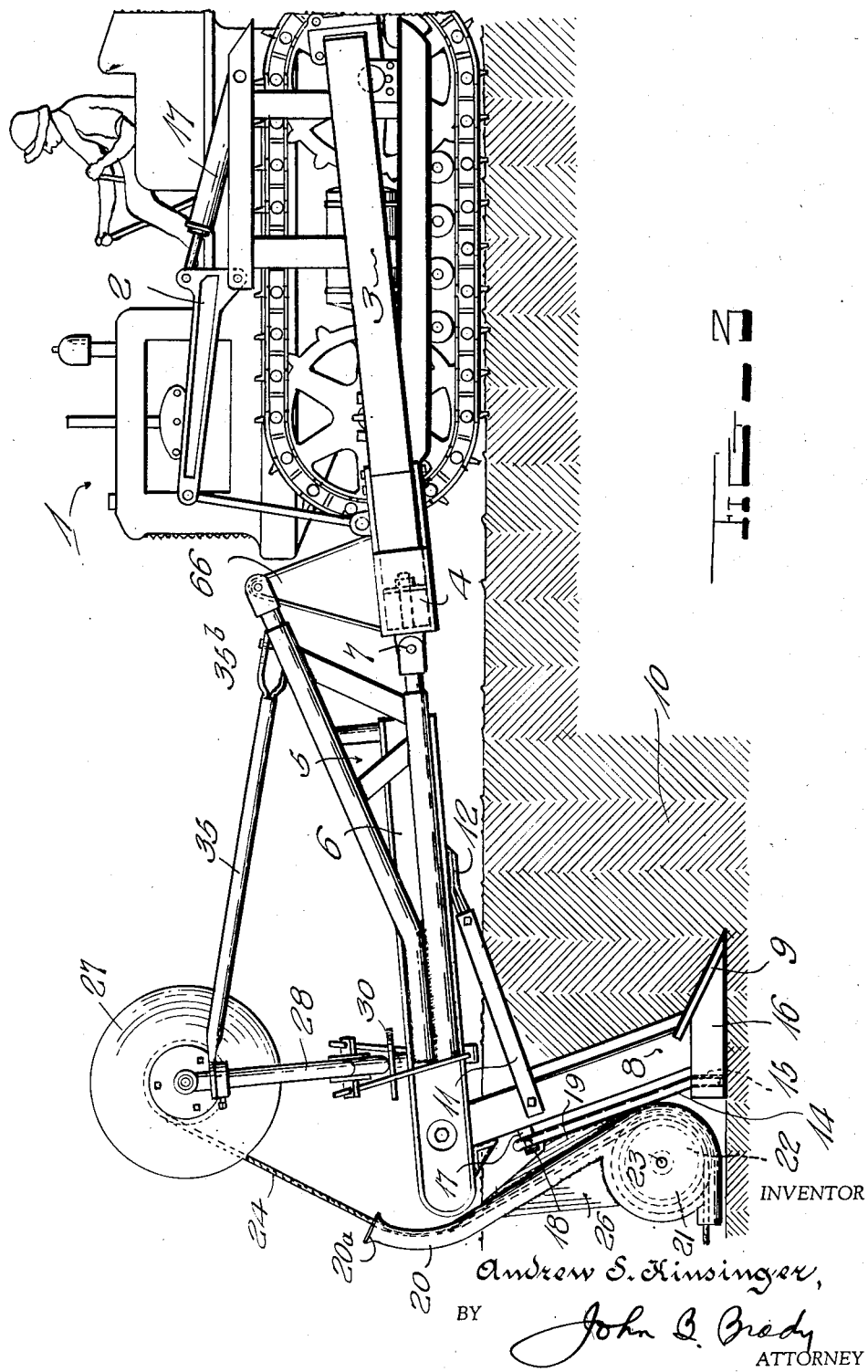

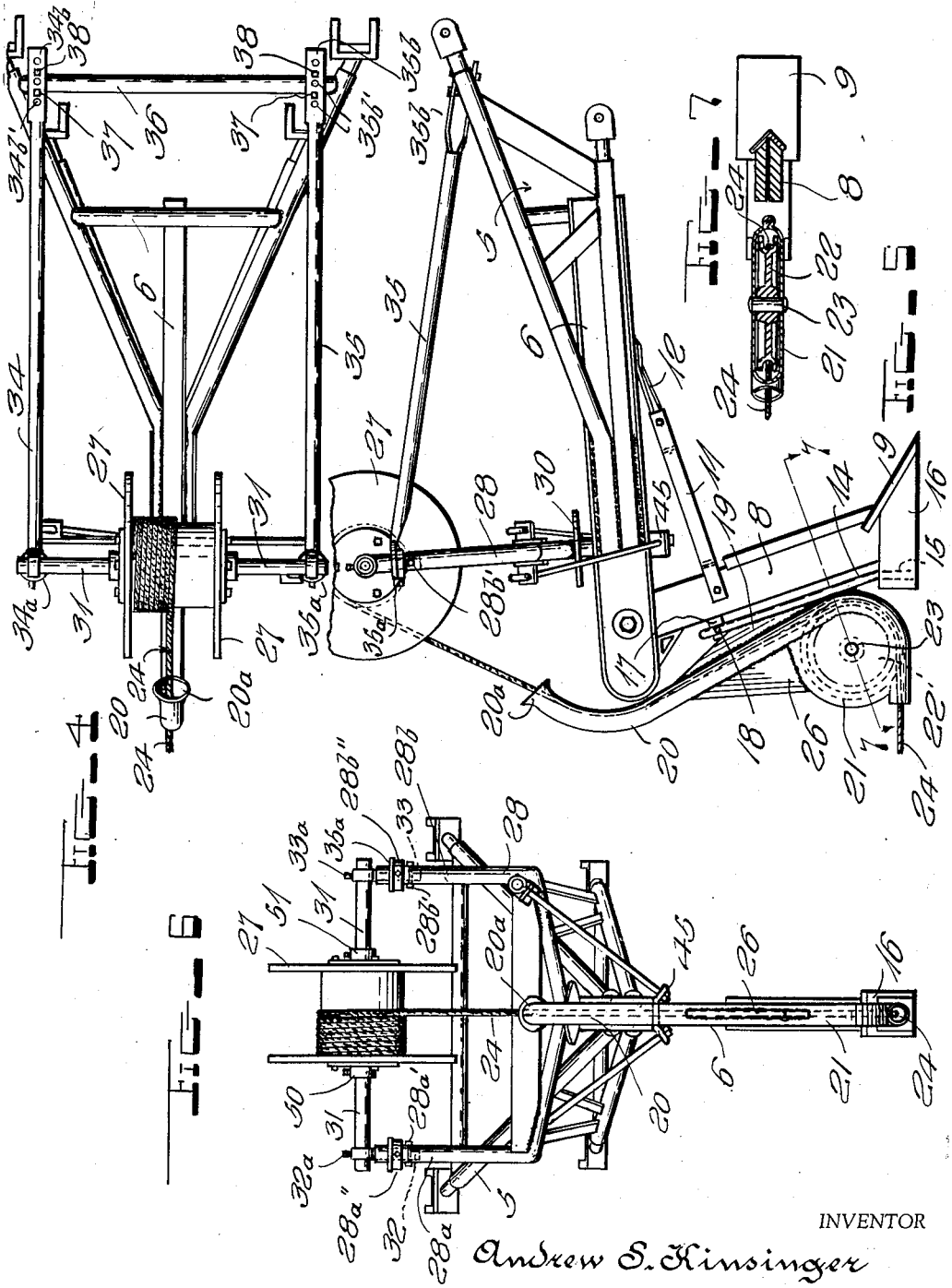

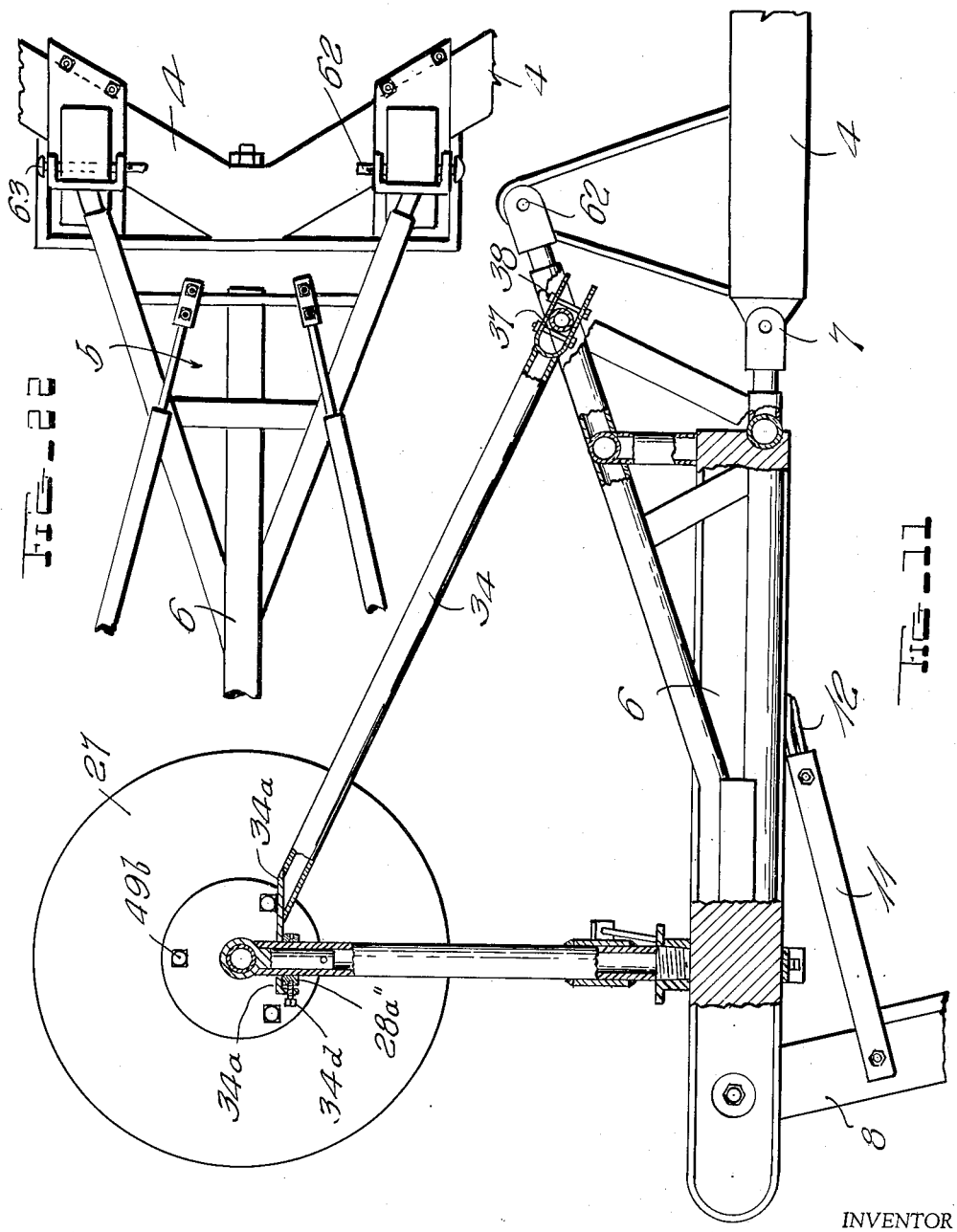

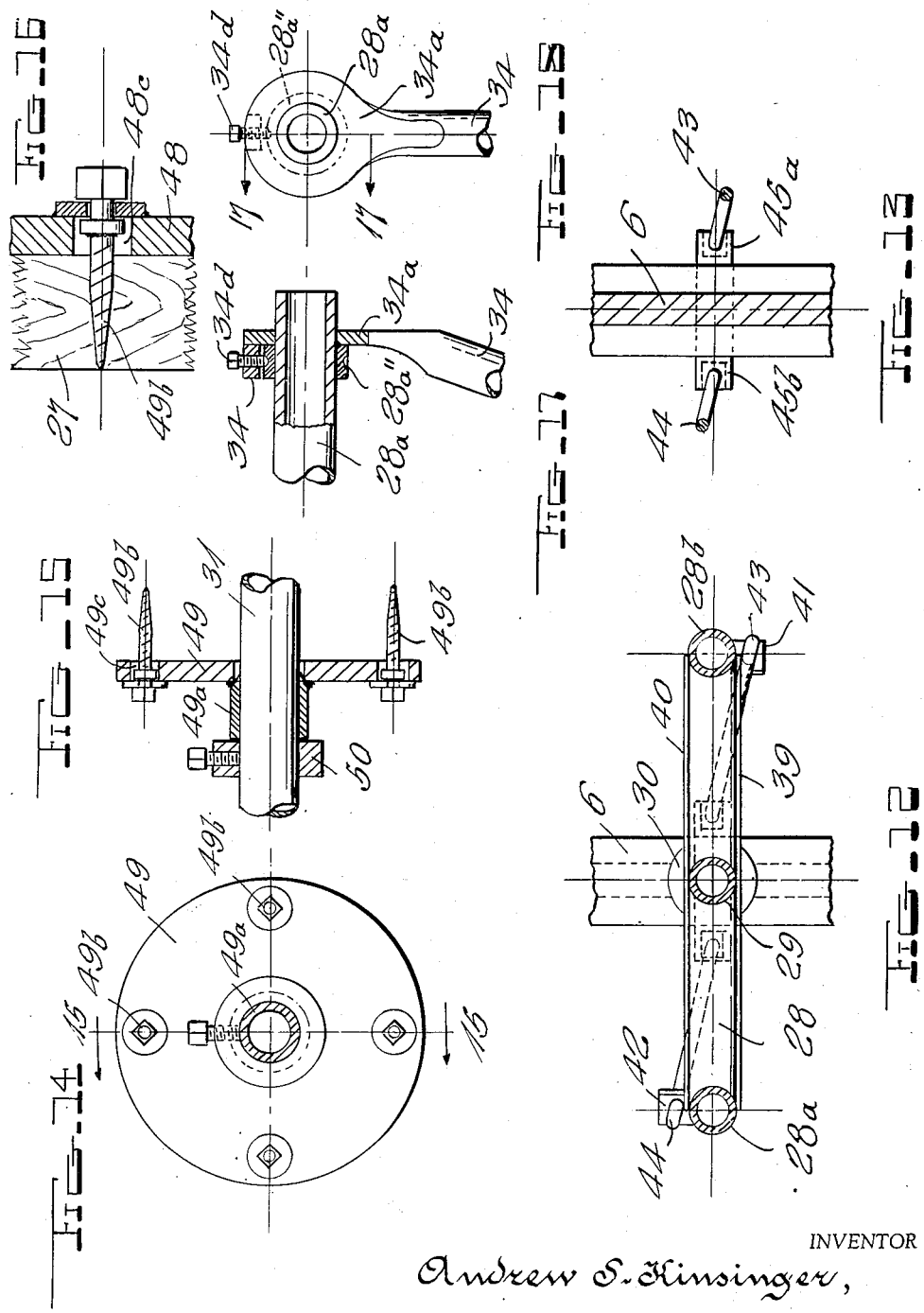

Dec. 22, 1953  A. S. KINSINGER  2,663,515
EXCAVATING AND CABLE LAYING MACHINE
Filed Feb. 13, 1951  9 Sheets-Sheet 8
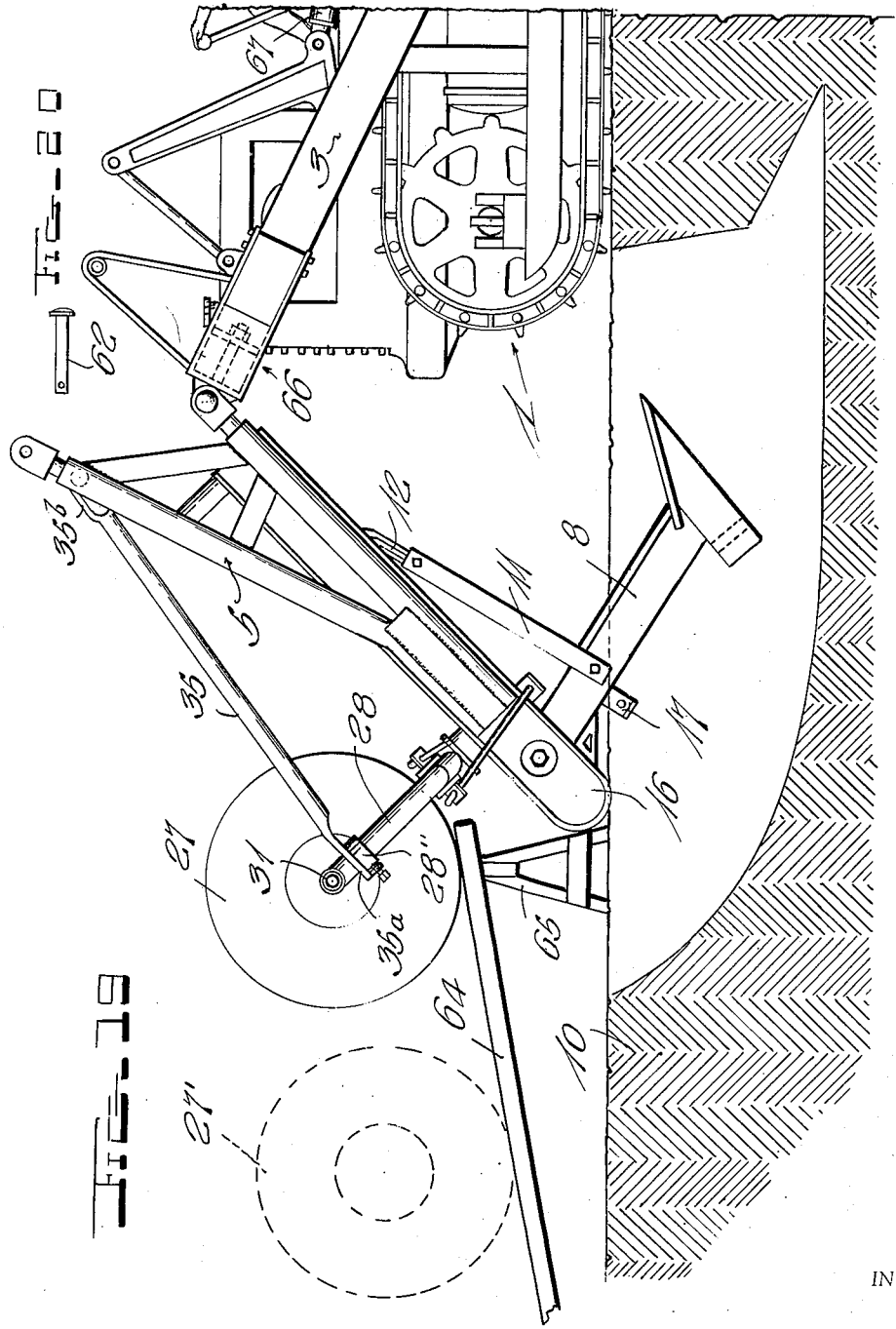
INVENTOR
Andrew S. Kinsinger,
BY John B. Brady
ATTORNEY Dec. 22, 1953   A. S. KINSINGER   2,663,515
EXCAVATING AND CABLE LAYING MACHINE
Filed Feb. 13, 1951   9 Sheets-Sheet 9
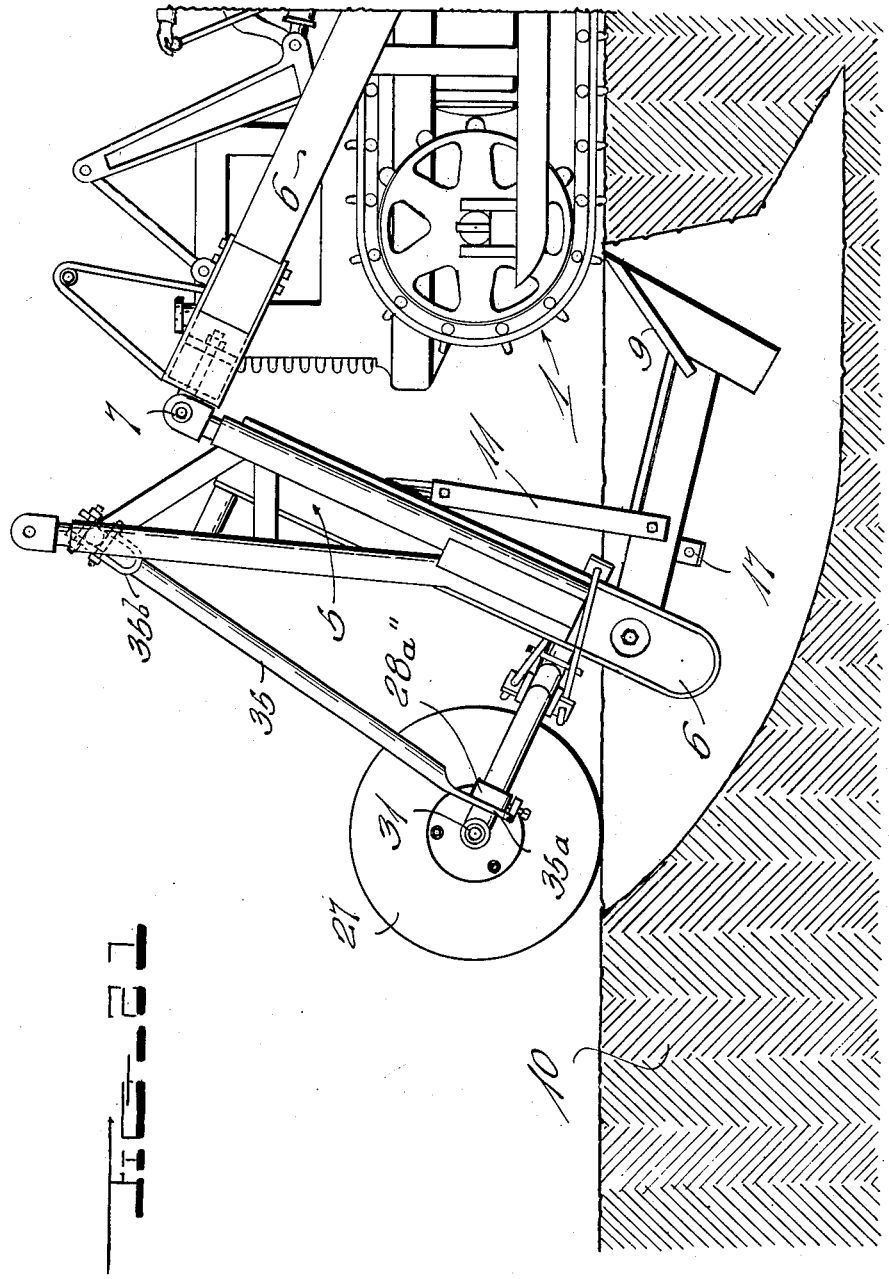
INVENTOR
Andrew S. Kinsinger,
BY John B. Brady
ATTORNEY Patented Dec. 22, 1953

2,663,515

UNITED STATES PATENT OFFICE 2,663,515

EXCAVATING AND CABLE LAYING MACHINE

Andrew S. Kinsinger, Gordonville, Pa.

Application February 13, 1951, Serial No. 210,679

8 Claims. (Cl. 242—90)

My invention relates broadly to heavy duty cable laying machines of the type in which an incision is made in the surface of the earth and a cable simultaneously laid therein.

One of the objects of my invention is to provide a construction of heavy duty cable laying machine of the type which makes an incision in the surface of the earth and simultaneously lays a cable therein and wherein provision is made for the removal of loaded cable drums on the machine with minimum manual effort in the loading of the cable drums.

Another object of my invention is to provide a construction of support for cable drums on the manipulator beam of a tractor which facilitates the loading of the drum on the support with minimum manual effort and without necessity of manually raising the drum into installed position.

Still another object of my invention is to provide a construction of drum journalling yoke for the manipulator beam of a tractor where a loaded cable drum may be rolled into position for installation on the yoke without lifting or raising the drum manually.

Still another object of my invention is to provide a cable drum journalling yoke construction for the manipulator beam of a tractor which includes reinforcement means for rigidly bracing the yoke adjacent the end of the manipulator beam of a tractor whereby the yoke is braced both laterally and longitudinally of the manipulator beam for resisting stresses and strains to which a cable loaded drum journalled on the yoke is subjected during operation of the tractor and in the course of the laying of a cable.

A still further object of my invention is to provide an improved construction of cable guide for attachment to the incision type tool of a cable laying tractor attachment by which minimum strain is produced upon the cable during a cable laying operation by passing the cable through a shaped tubular conduit formed adjacent a laterally journalled guide roller around the periphery of which the cable extends in the course of the laying of the cable below the surface of the ground in a path produced by an incision-like tool operated by the tractor.

Other and further objects of my invention reside in the construction of improved cable guide and yoke support for cable drums on the manipulator beam of a tractor as set forth more fully in the specification hereinafter following by reference to the accompanying drawings in which:

Figure 1 is a side elevational view showing the cable drum supporting mechanism of my invention associated with the manipulator beam of a tractor of the type equipped with two hydraulic jacks, where the manipulator beam is illustrated in a substantially vertical position for loading a cable drum on the drum journalling yoke by an operation which merely requires rolling the loading drum into position in which the drum may be journalled on the drum journalling yoke; Fig. 2 is a side elevational view showing the loaded cable drum in position on the manipulator beam of a tractor of the type having one hydraulic jack, and with the cable guide attached to the incision-like tool carried by the beam where the manipulator beam is shown in elevated position preparatory to commencement of a cable laying operation; Fig. 3 is a side elevational view similar to the view shown in Fig. 2 but illustrating the manipulator beam lowered to cable laying position in which the incision-like tool is in a position for producing an incision in the earth surface and for laying a cable immediately behind the incision-like tool; Fig. 4 is an enlarged plan view of the manipulator beam and the frame thereof particularly illustrating the means for bracing the cable drum carried by the yoke adjacent the end of the manipulator beam and showing the relative position of the cable guide with respect thereto; Fig. 5 is a side elevational view showing the assembly of the manipulator beam, the loaded cable drum, the brace means therefor and the cable guide as illustrated in Fig. 4; Fig. 6 is an end view of the assembly shown in Figs. 4 and 5; Fig. 7 is a transverse sectional view taken through the incision tool and the cable guide on line 7—7 of Fig. 5; Fig. 8 is an elevational view of the cable drum and the yoke for supporting the cable drum with parts broken away and shown in section for more clearly illustrating the relationship of the mounting means for the yoke and the manipulator beam; Fig. 9 is a fragmentary side elevational view of the cable drum mounting means with parts broken away and shown in section; Fig. 10 is a fragmentary plan view showing the manner of bracing the yoke which supports the cable drum with respect to the frame of the manipulator beam; Fig. 11 is a vertical sectional view taken substantially on line 11—11 of Fig. 8; Fig. 12 is a transverse sectional view taken substantially on line 12—12 of Fig. 8; Fig. 13 is a transverse sectional view taken substantially on line 13—13 of Fig. 8; Fig. 14 is an elevational view of one of the plate members which supports the heavy cable drum; Fig. 15 is a vertical sectional view taken substantially on line 15—15 of Fig. 14;

Fig. 16 is a fragmentary sectional view showing one of the detachable fastening means for securing the heavy cable drum to the plate member of Figs. 14 and 15; Fig. 17 is a detail cross-sectional view showing the manner of detachably fastening one of the brace bars which connects the top of the yoke with the manipulator frame, the view being taken on line 17—17 of Fig. 18 and being revolved to show the end of the yoke in one of its oriented substantially horizontal positions such as illustrated in Figs. 1 and 21; Fig. 18 is an end elevational view of the brace bar assembly shown in Fig. 17; Fig. 19 illustrated one manner of loading a heavy cable drum on a tractor equipped with a single hydraulic jack of the type illustrated in Figs. 2 and 3; Fig. 20 is an elevational view of one of the removable coupling bolts which are withdrawn for displacing the manipulator frame to a position in which a heavy cable drum may be loaded into the yoke by rolling the drum up a slight incline; Fig. 21 illustrated the manner of loading a heavy cable drum on the yoke of a manipulator frame of the type illustrated in Figs. 2, 3, and 19 employing a tractor of the single hydraulic jack type and where the cable drum does not have to be rolled up an incline but may be rolled horizontally along the surface of the earth and fastened into the yoke; and Fig. 22 is a plan view illustrating the uncoupling means between the manipulator adapter and the manipulator frame for permitting displacement of the manipulator frame to a position for loading the cable drum thereon.

My invention is directed to a construction of attachment for tractors for facilitating the laying of heavy cable in the earth simultaneously with the production of an incision in the surface of the earth by an incision-like tool associated with the cable laying equipment and operated by a tractor. My invention relates to the general class of structures shown in my co-pending applications, Serial Number 149,379, filed March 13, 1950, for Composite Excavating and Pipe Laying Machine; Serial Number 185,090, filed September 15, 1950, for Composite Excavating and Cable and Flexible Conduit Laying Machine; Serial Number 188,550, filed October 5, 1950, for Composite Excavating and Earth Distributing and Leveling Machine; Serial Number D. 13,246, filed December 2, 1950, for Attachment for Tractors for Use in Excavating and the Laying of Pipes and Cables; and application Serial Number 205,939, filed January 13, 1951, for Structure for Mounting, Excavating and Pipe and Cable Laying Means on Tractors. While the mounting of relatively small and light weight cable reels on the manipulator beam of a tractor can be readily accomplished with the structures I have heretofore disclosed in my aforesaid applications, a wholly different problem is involved in the laying of heavy cables inasmuch as the loading of the heavy cable drum on the manipulator beam and the guiding and directing of the cable from the drum requires substantially different structures for insuring the proper installation of the cable mounting drum and the guiding of the heavier cable to the position in which the cable must be laid in the incision-like trench which is produced by the operation of the tractor. In the attachment of my present invention, I so locate a journalling yoke adjacent the end of the manipulator beam that the manipulator beam may be moved under control of the hydraulic control means on the tractor to a substantially vertical position in which the open yoke extends forwardly to a position enabling a loaded cable drum to be rolled into a position along the surface of the earth aligned with the journalling position in the yoke and coupled to the yoke so that when the manipulator beam is elevated the loaded cable drum is lifted in a position in which the cable may be unrolled therefrom in the course of the cable laying operation and the cable passed through a cable guide which is coupled to the rear of the incision-like tool operated by the tractor. The guide for the heavy cable laying machine of my invention is formed by a tubular member attachable and detachable from the rear of the incision-like tool and includes a guide roller adjacent the end thereof around the periphery of which the heavy cable is directed for laying the cable in the incision-like trench which is produced well below the surface of the earth as the tractor is operated.

The details of the heavy cable laying mechanism will be more fully understood by more detailed reference to the drawings in which reference character 1 designates a conventional caterpillar tractor having a hydraulic manipulator mechanism represented generally at 2 controlled from the operator's position on the tractor. The hydraulic manipulator mechanism 2 controls the pivoted frame 3 which supports on the front thereof the adapter 4 to which the frame 5 of the manipulator beam 6 is pivotally connected as represented at 7. The manipulator beam 6 is provided with a downwardly extending incision-like tool 8 adjacent the end thereof, the tool terminating in a cutting incision-like face 9 for producing the incision-like trench in the surface of the earth 10 when the tractor is operated in the assembled position illustrated in Fig. 3. The downwardly extending incision-like tool 8 is reinforced by connecting link 11 fastened through strap 12 to the undersurface of the manipulator beam 6. The rear of the incision-like tool 8 is provided with a detachable bar member 14 which fits into the substantially vertically extending socket 15 in the rear of the block 16 which supports the cutting and incision-like face 9 of the tool. The detachable bar 14 is connectible at its upper extremity to a lug member 17 which extends from the depending incision-like tool 8 by means of appropriate laterally extending bolt member indicated at 18. The detachable bar 14 forms a support for the longitudinally extending coplanar plate 19 which is attached to the front of the substantially S-shaped tubular member 20. The S-shaped tubular member 20 has its upper end extending around and above the end of the manipulator beam 6 as represented at 20a and has its lower end extending around the circular casing represented at 21. Circular casing 21 forms a housing in which the revolvable rotor 22 is journalled as represented at 23. The rotor 22 has a grooved peripheral edge into which the heavy cable 24 is guided for directing the cable into the incision-like trench 25 which is produced in the earth by operation of the tractor as represented in Fig. 3. The tubular guide 20 is reinforced above the casing 21 by means of plate 26 which is secured in position between the rear of tubular member 20 and the top wall of casing 21 by welding or other appropriate means. The entire assembly of the heavy cable guide may be readily detached from and connected with the depending incision-like tool 8. When the manipulator beam is first loaded with the heavy cable drum as represented in Fig. 1, the cable guide is entirely removed from the rear of the incision-like tool so that there is no obstruction which prevents the lowering of the manipulator beam to a position contacting the surface of the earth as represented in Fig. 1 enabling the cable drum to be rolled into position and journalled with respect to the beam.

The yoke which provides the mounting means for the heavy cable drum 27 is represented at 28. The yoke 28 has a central depending support 29 which is arranged to be inserted in the socket member 30 mounted adjacent the end of the manipulator beam 6. The location of the socket member 30 is very important as will be realized more particularly by reference to Fig. 1 showing the manner of installing the heavy cable drum 27 on the manipulator beam. The manipulator beam is so moved by the hydraulic manipulator mechanism 2 of the tractor 1 that the incision-like tool 8 is doubled under the frame 3 in a position directed toward tractor 1 and the end of manipulator beam 6 substantially contacts the surface of the earth 10 as a tangent. In this position the yoke 28 which extends in a transverse plane substantially normal to the axis of the manipulator beam terminates in a position in which the ends of the yoke are located at a center which is at a distance above the surface of the earth 10 substantially equal to the radius of the loaded cable drum 27. Because of this proportion and relationship, the loaded cable drum 27 may be rolled from the dotted line position 27' in Fig. 1 to the full line position at which time the transverse bar 31 which extends through the loaded cable drum 27 may have the pintles 32 and 33 which are carried thereby inserted into the upwardly extending open tubular ends 28a and 28b of the yoke 28 and secured in position therein by means of transverse pins 28a' and 28b'. All of this is accomplished without manually elevating the heavily loaded cable drum 27. The upwardly extending ends 28a and 28b of the yoke 28 each carry sleeve-like flanges 28a'' and 28b'' thereon which are fixed in position adjacent the upper extremities of the ends 28a and 28b of the yoke 28. These fixed positions of the sleeve-like flanges 28a'' and 28b'' provide abutment stops against which the brace bars 34 and 35 abut. Brace bars 34 and 35 terminate at their forward ends in substantially horizontally extending flanges 34a and 35a containing eyelets which pass over the ends 28a and 28b of the yoke 28 prior to the insertion of the pintles 32 and 33. The opposite ends of the brace bars 34 and 35 terminate in forks 34b and 35b which extend over the transversely extending bar member 36 forming part of the frame 5 and are secured thereto by fastening bolts 37 and 38 having their ends extending through selected ones of the spaced apertures 34b' and 35b' in the forks 34b and 35b for adjustably selecting the bracing distance between transverse member 36 and the yoke 28 for thus rigidly securing the yoke 28 in position.

In addition to the aforesaid bracing, the yoke 28 is provided adjacent its laterally extending portion with a pair of bracing plates 39 and 40 which are welded in positions tangent to the vertically extending portions 28a and 28b of the yoke 28 and to the central depending support 29 which is inserted in socket member 30 carried by the manipulator beam 6. The bracing plates 39 and 40 prevent the lateral spreading of the vertically extending portions 28a and 28b of the yoke 28. In order to further brace the yoke 28 against strains I provide angle members 41 and 42 which are fastened in diagonally opposite positions adjacent the base of the upwardly extending ends 28a and 28b of the yoke 28 and in an angular position thereon. The angle members 41 and 42 are apertured and receive the headed bolts 43 and 44 which extend downwardly toward each other and pass through the ends of the laterally extending bar member 45. The bar member 45 is secured transversely to the underside of the manipulator beam 6 and has its terminating ends bent downwardly at 45a and 45b to receive the ends of the headed bolts 43 and 44 respectively. The ends of the downwardly extending bolts 43 and 44 are screw threaded and are engaged by nuts 46 and 47 which may be tightened to brace the yoke 28 in a transverse position on the end of the manipulator beam 6. Thus the yoke 28 is braced adjacent its upper extremity by brace bars 34 and 35 and adjacent its lower structure by plates 39 and 40 and bolt members 43 and 44. The bolt members 43 and 44 extend in opposite angular directions with respect to a transverse plane through the yoke thereby resisting any tendency of twisting of the yoke under considerable stress and strain to which the yoke is subjected in the loading of heavy cable reels as illustrated in Fig. 1.

The heavy cable drum 27 is secured to the transverse bar 31 by means of plate members 48 and 49. The plate members 48 and 49 are welded to central sleeve members 48a and 49a through which the transverse bar 31 extends. The plate members 48 and 49 are secured to opposite sides of the heavy cable drum 27 by means of headed screws 48b and 49b which pass through apertures 48c and 49c in the plates 48 and 49 respectively and are embedded in the sides of the heavy cable drum 27. When the cable drum 27 is properly centered on transverse bar 31 the cable drum is fixed in the centered position on the transverse bar 31 by adjustable sleeve members 50 and 51 for confining the cable drum 27 to rotation on transverse bar 31 in a position centrally of the yoke 28. By reason of this construction a variety of cable drums of different widths may be mounted on the transverse bar 31 and centered in position for feeding the cable 24 through the receiving end 20a of cable guide 20 for delivery around guide roll 22 to the discharge end thereof in the rear of the incision-like tool 8.

The method of loading the heavy cable drum shown in Fig. 1 is employed for tractors having two hydraulic jacks which I have represented at 55 and 56 operating control plungers 55a and 56a connected with manipulator 57 which pivotally connects with the lower coupling extremities of frame 5 at 58. The upper coupling extremities 59 of frame 5 in this arrangement connect through links 60 and 61 controlled by the operating control plunger 55a of hydraulic jack 55. In this arrangement it will be apparent that the frame 5 is very readily moved to the position shown in Fig. 1 for loading the heavy cable drum 27. However, in the arrangements illustrated in Figs. 2 and 3 which employ one hydraulic jack on the tractor a different method of loading the heavy cable drum must be pursued as represented in Figs. 19 and 21. In the arrangement illustrated in Fig. 21 the frame 5 which is normally pivotally connected at quadrilaterally spaced positions 7 to the adapter 4 on the pivoted frame 3 is uncoupled at its upper extremities from adapter 4 by removal of coupling bolts 62 and 63 enabling the manipulator beam 6 to be dropped to the ground. Preparatory to this operation the tubular guide 20 and its associated assembly is removed from the incision tool so that there is no obstruction to the movement of the manipulator beam 6 to the position illustrated in Fig. 19 where the end of manipulator beam 6 is substantially tangent with the surface of the earth 10. In this position the yoke 28 is lowered so close to the earth's surface that a slightly elevated inclined plane 64 may be erected on a suitable support 65 immediately in front of the manipulator beam 6 to allow the heavy cable drum 27 to be rolled through successive positions illustrated at 27' to the position 27 where the transverse bar 31 may be mounted in the open tubular ends 28a and 28b of the yoke 28.

In situations where the cable drum is particularly heavy it is unnecessary to even roll the drum up the incline represented by incline plane 64 as the tractor 1 may be driven slowly toward the manipulator frame 5 in the uncoupled position of the manipulator frame illustrated in Fig. 19 to shift the frame 5 in its uncoupled position pivoted at the two lower pivots 7 between the adapter 4 and frame 5 resulting in pressing the incision tool 8 further into the ground so that the end of the manipulator beam 6 is embedded into the ground a sufficient distance to present the ends 28a and 28b of yoke 28 at a position above the earth's surface sufficient to enable the heavily loaded cable drum to be rolled on the earth's surface from the position 27' to the position 27 where the heavy cable drum is coupled to the yoke.

After the loading operation depicted in Figs. 19 and 21 the pivoted frame 3 is driven downwardly moving the upper extremities of adapter 4 into a position where the upper ends of manipulator frame 5 at 7 may be aligned with the upper extremities 66 of the adapter 4 enabling coupling bolt 62 to be slipped into position therethrough and through the upper pivotal connection 7 of the manipulator frame 5 after which the manipulator frame 5 is under full control of the hydraulic jack of the tractor represented at 67.

I have heretofore alluded to the manner of rigidly bracing the yoke 28 transversely of the manipulator beam 6. This rigid bracing is very important because of the stresses and strains to which the heavily loaded cable drum 27 is subjected. Hence the brace bars 34 and 35 may require adjustment with respect to the upwardly projecting ends 28a and 28b of the yoke 28 to meet conditions of different loadings. For this purpose the flanges 34a and 35a of the brace bars 34 and 35 are each provided with depending lugs represented in Figs. 17 and 18 for example by depending lug 34c through which the adjustable set screw 34d extends for gripping recesses formed in the external surface of sleeve-like flange 28a''. Brace bars 34 and 35 are capable of orientation about transversely extending bar member 36 forming part of frame 5 by loosening the fastening bolts 37 and 38 as shown more particularly in Fig. 11 enabling the eyelets in the flanges 34a and 35a to be moved to the selected position along the ends 28a and 28b of yoke 28 before the set screws 34d and 35d are secured firmly in located position.

When the pintles 32 and 33 are properly secured in the tubular ends 28a and 28b of the yoke 28 the pintles 32 and 33 are located therein against removal by transverse pins 28a' and 28b' having headed ends and screw threaded shanks engaged by screw threaded nuts which enable the pintles 32 and 33 to be readily removed. The transverse bar 31 carrying the loaded drum 27 is secured in the ring-like ends of the pintles 32 and 33 by set screws 32a and 33a. Thus the cable drum 27 when properly centered between sleeve members 50 and 51 is free to revolve about transverse bar 31 in delivering the cable 24 through the tubular guide 20 and around the revolvable rotator 22 in casing 21 as heretofore explained.

By reason of the ease of loading of the heavy cable drums on the manipulator and the flexibility of control of the manipulator with the heavy cable drum mounted thereon and operating in conjunction with the anti-friction guide of my invention I have found this attachment highly practical and successful in operation. While I have described my invention in one of its preferred embodiments, I desire that it be understood that no limitations upon my invention are intended other than may be imposed by the scope of the appended claims.

What I claim as new and desire to secure by Letters Patent of the United States is as follows:

1. An attachment for tractors of the type including a hydraulically controlled manipulator terminating in quadrilaterally spaced pivotal connections, a manipulator frame connected with said pivotal connections, a manipulator beam carried by said manipulator frame, certain of said pivotal connections constituting detachable coupling means for dropping said manipulator frame with respect to the manipulator on the tractor, a transversely extending yoke carried by said manipulator frame, pintles secured in the extremities of said yoke for receiving a transversely extending bar therethrough and a cable drum journalled on said bar, the projection of said yoke from said manipulator beam being such that a cable drum may be rolled into position and attached to said yoke while said beam is in dropped position with respect to said tractor and the cable drum elevated by said manipulator beam when said manipulator frame is coupled with said manipulator.

2. A cable laying attachment for tractors of the type including a hydraulically controlled manipulator, said attachment comprising a manipulator frame terminating in quadrilaterally spaced connection means adapted to be pivotally and detachably coupled with said hydraulically controlled manipulator, a screw threaded socket supported at the top of said manipulator frame, a yoke having a central depending screw threaded stem adapted to engage said screw threaded socket for detachably mounting said yoke with respect to said frame, a transverse bar extending beneath said manipulator frame, a pair of spaced diagonally disposed brace bars extending through said transverse bar and attached to opposite positions on said yoke for rigidly bracing the lower end of said yoke with respect to said manipulator frame, brace bars extending between said manipulator frame and the upper extremities of said yoke for bracing said yoke in a longitudinal direction and a rotatable cable drum mounted on the upper extremities of said yoke.

3. A cable laying attachment for tractors comprising in combination with the manipulator of a tractor, a manipulator frame terminating at one end in quadrilaterally spaced connection members, means for pivotally and detachably coupling said connection members with said manipulator, a longitudinally extending beam carried by said manipulator frame, a yoke projecting from the upper side of said beam, a cable drum journalled with respect to the upper ends of said yoke, the dimensions of said manipulator frame, said yoke and said cable drum being such that the end of said longitudinally extending beam may be moved to contacting relation with the earth for presenting said yoke at a position in which the cable drum may be journalled transversely in the yoke by rolling the cable drum into position between the ends of the yoke and fastening the cable drum into position for rotative movement with respect to the yoke subject to reestablishment with coupled relationship between the manipulator and the manipulator frame.

4. A cable laying attachment for tractors comprising in combination with the hydraulically controlled manipulator of a tractor, a manipulator frame including a manipulator beam having pivotal and detachable coupling relation with said hydraulically controlled manipulator whereby the manipulator frame may be moved to a variety of angular positions with respect to said manipulator for presenting said manipulator beam in selected angular positions with respect to the earth and a transversely extending yoke carried by said manipulator beam and adapted to be presented in a position adjacent the earth's surface sufficient to enable a loaded cable drum to be rolled into position and journalled with respect thereto for elevation and manipulation by said manipulator.

5. A cable laying attachment for tractors as set forth in claim 4 in which said yoke is braced transversely with respect to said beam and wherein the ends of said yoke are braced longitudinally with respect to said manipulator frame.

6. A cable laying attachment for tractors as set forth in claim 4 in which angularly adjustable brace bars extend from remote ends of said manipulator frame and embrace the upper ends of said yoke, said brace bars being angularly adjustable both with respect to said manipulator frame and with respect to upper ends of said yoke for maintaining said yoke in a substantially transverse plane with respect to said beam under various conditions of stresses and strains to which said yoke is subjected under operation of said cable drum.

7. A cable laying attachment for tractors as set forth in claim 4 in which said loaded cable drum is supported by a transverse bar and wherein the terminating ends of said yoke are tubular, the said transverse bar having pintles attached thereto and insertable into the open tubular ends of said yoke, means for confining said pintles in the ends of said yoke and means for confining said cable drum for rotation about said transverse bar in a position centrally aligned with said manipulator frame.

8. A cable laying attachment for tractors as set forth in claim 4 in which the front and rear sides of said yoke are interconnected by transversely extending plates which prevent spreading of the upper extremities of said yoke under conditions of stresses and strains to which said yoke is subjected upon rotation of the cable drum in manipulation of said manipulator frame.

ANDREW S. KINSINGER.

References Cited in the file of this patent

UNITED STATES PATENTS

| Number | Name | Date |
|---|---|---|
| 1,054,313 | Richardson | Feb. 25, 1913 |
| 1,949,481 | Koller | Mar. 6, 1934 |
| 2,118,535 | Garlinger | May 24, 1938 |
| 2,135,973 | Garlinger | Nov. 8, 1938 |
| 2,254,324 | Sjogren et al. | Sept. 2, 1941 |
| 2,612,345 | Schatz et al. | Sept. 30, 1952 |
| 2,616,636 | Aden | Nov. 4, 1952 |